No. 768,537. PATENTED AUG. 23, 1904.
J. F. McELROY.
AIR BRAKE.
APPLICATION FILED FEB. 19, 1902.
NO MODEL. 5 SHEETS—SHEET 1.

Witnesses
L. T. Shaw
A. Dewhurst

Inventor
James F. McElroy
E. M. Bentley
by Atty

Fig.3

No. 768,537. PATENTED AUG. 23, 1904.
J. F. McELROY.
AIR BRAKE.
APPLICATION FILED FEB. 19, 1902.
NO MODEL. 5 SHEETS—SHEET 4.

No. 768,537. PATENTED AUG. 23, 1904.
J. F. McELROY.
AIR BRAKE.
APPLICATION FILED FEB. 19, 1902.
NO MODEL. 5 SHEETS—SHEET 5.

Witnesses
L. J. Shaw
A. Dewhurst

Inventor
James F. McElroy
by E. M. Bentley
Atty

No. 768,537.

Patented August 23, 1904.

UNITED STATES PATENT OFFICE.

JAMES F. McELROY, OF ALBANY, NEW YORK, ASSIGNOR TO CONSOLIDATED CAR HEATING COMPANY, OF ALBANY, NEW YORK, A CORPORATION OF WEST VIRGINIA.

AIR-BRAKE.

SPECIFICATION forming part of Letters Patent No. 768,537, dated August 23, 1904.

Application filed February 19, 1902. Serial No. 94,708. (No model.)

*To all whom it may concern:*

Be it known that I, JAMES F. McELROY, a citizen of the United States, residing at Albany, county of Albany, and State of New York, have invented certain new and useful Improvements in Air-Brakes, of which the following is a specification, reference being made to the accompanying drawings, wherein—

In the system of air-brakes now commonly employed the train-pipe pressure is balanced against the pressure in the auxiliary reservoir on each car (by means of an intermediate piston subjected to the opposing pressures) for the purpose of maintaining the pressure in the said reservoir and also for maintaining the triple valve in a condition wherein the auxiliary reservoir is disconnected from the brake-cylinder and the exhaust-port of the said cylinder open to the atmosphere during the time that the brakes are released. To apply the brakes in the said system, the pressure in the train-pipe is reduced, which allows the reservoir-pressure to preponderate, and thereby operate the intermediate piston. This opens the admission-port from the auxiliary reservoir into the brake-cylinder and closes the exhaust-port of said cylinder, there being also additional emergency appliances which it is unnecessary to describe. In thus applying the brakes the degree of brake-pressure is determined by the degree to which the train-pipe pressure is reduced by the engineer, and it is possible to apply the brakes with a given force by reducing the train-pipe pressure to a certain degree and to then increase the force of application by a second decrease of train-pipe pressure. It is, however, impossible in the system aforesaid to decrease the brake-pressure after it has once been applied except by first releasing the brakes entirely and then make a second application at the desired reduced pressure, and if the auxiliary reservoir has in the meantime become depleted the second application cannot be made until the said reservoir has been refilled through the train-pipe and the normal reservoir-pressure thereby restored. It is highly desirable, however, that the engineer should be able to reduce as well as increase the brake-pressure without taking the time required to completely release the brakes and make a second application thereof at the desired lower pressure. For example, when the train is running at a high speed it is necessary to apply the brakes with a force which, if maintained as the train slowed down, would be too great and would cause the wheels to skid, and by the present methods such decreased pressure can only be secured by first releasing the brakes and then making a second application thereof, as aforesaid. On long grades also the auxiliary reservoir may become exhausted and the engineer must let off his brakes and wait till his reservoir-pressure has been pumped up. This is objectionable and even dangerous. This is a recognized defect in the present air-brake systems, and various devices have been employed to mitigate it without, however, avoiding it.

It is the object of my present invention to avoid the described defect and to adjust at will the pressure of the brakes upon the wheel after they have once been applied without the necessity of first releasing them and, moreover, to make the initial application with a greater or less force, as may be desired.

Still another object of the invention is to avoid such variations in the pressure of the brakes upon the wheels as are now found to exist by reason of the difference in the degree to which the brakes are worn down. Obviously if the brakes are well worn it may require a travel of nine inches of the brake-cylinder piston to set the brakes, whereas a travel of but four inches would set them when they are new or newly adjusted. In the present system the brakes are applied by the admission to each brake-cylinder of a definite volume of air determined by the capacity of the auxiliary reservoir and by the amount of the reduction made in the train-pipe pressure below the normal. Such a fixed amount of air will evidently give a lower pressure or force of application when the piston of the brake-cylinder is required to travel nine inches than when it is required to travel but four inches, since the air supplied to the cylinder will exert much less pressure on the piston after it is allowed to expand to fill nine inches of the cylinder than when it has to fill but four inches. In my system the brake-pressure is determined by the pressure attained in the brake-cylinder and not by the amount of air admitted thereto. In other words, the air continues to flow into the cylinder until the desired pressure therein is established, the amount flowing into a cylinder with a piston traveling nine inches being correspondingly greater than that into a cylinder whose piston travels but four inches. Thus in my system the brake-pressure is the same at all of the brakes and the amount of air admitted is variable, while in prior systems the amount of air admitted is the same at all brakes and the brake-pressure thereby produced is variable. I also utilize my system to compensate automatically for any leakage in the train-pipe or in the engineer's valve.

I accomplish the described objects without any radical departure from the type of apparatus now in general use, so that cars equipped with my brake may still be used under the system now in vogue in trains wherein the brakes of the remaining cars are of the present type.

My invention consists in certain apparatus involving as the principal feature thereof a triple valve, connected, as usual, with the train-pipe, the auxiliary reservoir, and the brake-cylinder, and so organized that not only is the admission of air from the reservoir to the cylinder controlled by the train-pipe pressure, but, in addition, the pressure in the cylinder is automatically governed so as to reach and be maintained at a certain standard figure, the standard being set and controlled by the engineer through the agency of the train-pipe pressure. This is accomplished by balancing the train-pipe pressure against a fixed pressure, also against the pressure of the brake-cylinder and by the resultant, governing both the inlet and outlet valves of the cylinder. By this means the cylinder-pressure varies inversely as the train-pipe pressure, but not at the same rate, since the two pressures act on opposing pistons of different areas, that for the train-pipe pressure being larger than that for the cylinder, so that an increase of pressure in the cylinder takes place at a much greater rate than the corresponding decrease of pressure in the train-pipe. There are various other features which will be explained in detail, it being understood that the embodiment of my invention by the apparatus herein shown and described is but an illustration of the said invention which may also be embodied in other apparatus acting upon the same general principles.

Figure 1:
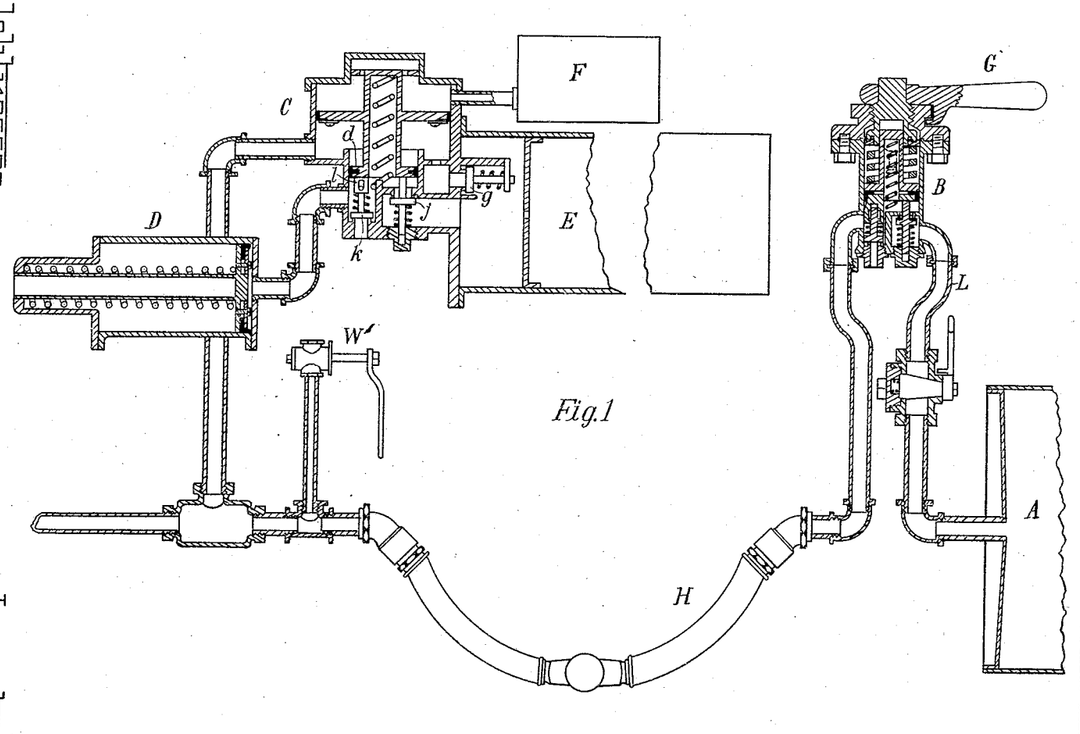
Figure 1 is a diagram illustrating my system as applied to a train.

Referring to the drawings, A, Fig. 1, represents the reservoir on the locomotive, wherein a definite air-pressure is automatically maintained by an air-pump in a manner well known to the art.

B is the engineer's valve.

C is my new form of triple valve.

D is the brake-cylinder, E is the auxiliary reservoir, and F is a small equalizing-reservoir which I prefer to employ in connection with my device, although, as will be shown hereinafter, its function may be performed by other means.

The engineer's valve B will be hereinafter described in detail, it being only necessary to say regarding it at present that the engineer is enabled by means of it to apply any desired train-pipe pressure by a movement of the handle G in one direction or the other, each position of the handle G corresponding to a definite degree of pressure in the train-pipe H. The details of the triple valve C may be more readily understood by reference to Fig. 2, although it is also shown in Fig. 1, and the parts thereof are similarly lettered in both figures. In this triple valve $a$ is a piston fitted within a cylinder $b$ and provided with a packing-ring $c$, turned upward around the edge of the piston, so as to allow a slight leakage of air from the under side to the upper side of the piston, but no leakage in the reverse direction. The cylinder $b$ communicates with the equalizing-reservoir F at a point above the said piston, the purpose of this being to secure a constant standard pressure within the cylinder above the piston, which will determine the action of the train-pipe pressure upon the piston, permitting it to lift the piston if the train-pipe pressure is greater than the equalizing-pressure, but allowing the piston to descend when the reservoir-pressure preponderates. The slight leakage of air past the packing $c$ will fill the cylinder-space above the piston and also the equalizing-reservoir and maintain therein a normal standard pressure equal to the maximum pressure delivered by the train-pipe. A perforated guiding-disk $f$ travels in a cylindrical extension of cylinder $b$, but does not act to compress any air therein or to otherwise affect the downward pressure upon piston $a$, which will always be applied to the entire piston area, including the area of the hollow central shaft or rod to which the piston is attached.

The cylinder $b$ communicates at its lower end with a smaller cylinder $e$, in which travels a piston $d$, connected with the piston $a$ through the hollow shaft aforesaid. The piston $d$ is packed, so as to avoid leakage of the air in either direction. The two pistons and their common central shaft are upheld by a spring $h$, that serves to counterbalance the weight of the two pistons and the shaft and the downward pressure of the air in case of a larger piston area being subjected to the equalizing-reservoir pressure than to the train-pipe pressure. To the under side of piston $d$ is attached a link or loop $l$, engaging with the stem of the exhaust-valve $k$ and serving to lift the said valve whenever piston $d$ rises above the normal position. (Shown in Fig. 2.) The under side of the piston $d$ also engages the stem of the inlet-valve $j$ between the auxiliary reservoir and the brake-cylinder. The valve $j$ remains closed when the parts are in the position shown in Fig. 2, but is opened whenever the piston $d$ descends below the position shown in the figure. Therefore the upward travel of the said piston $d$ from the normal position shown will open the exhaust-valve $k$, leaving the inlet-valve $j$ closed, while any downward movement of the piston from the position aforesaid opens the inlet-valve, leaving the exhaust-valve closed. The opening of the valve $j$ will admit air from the auxiliary reservoir into the brake-cylinder, but the air must first pass into the cylinder $e$ and fill the space therein below the piston $d$, the space above the said piston opening into the cylinder $b$ and receiving the pressure therein existing on the under side of the piston $a$. The cylinder $b$ also communicates directly with the auxiliary reservoir E through the check-valve $g$. The auxiliary reservoir E is provided with a partition $H'$, having a small opening therein, and the valve $g$ opens into the compartment at the left of the said partition.

Figure 2:
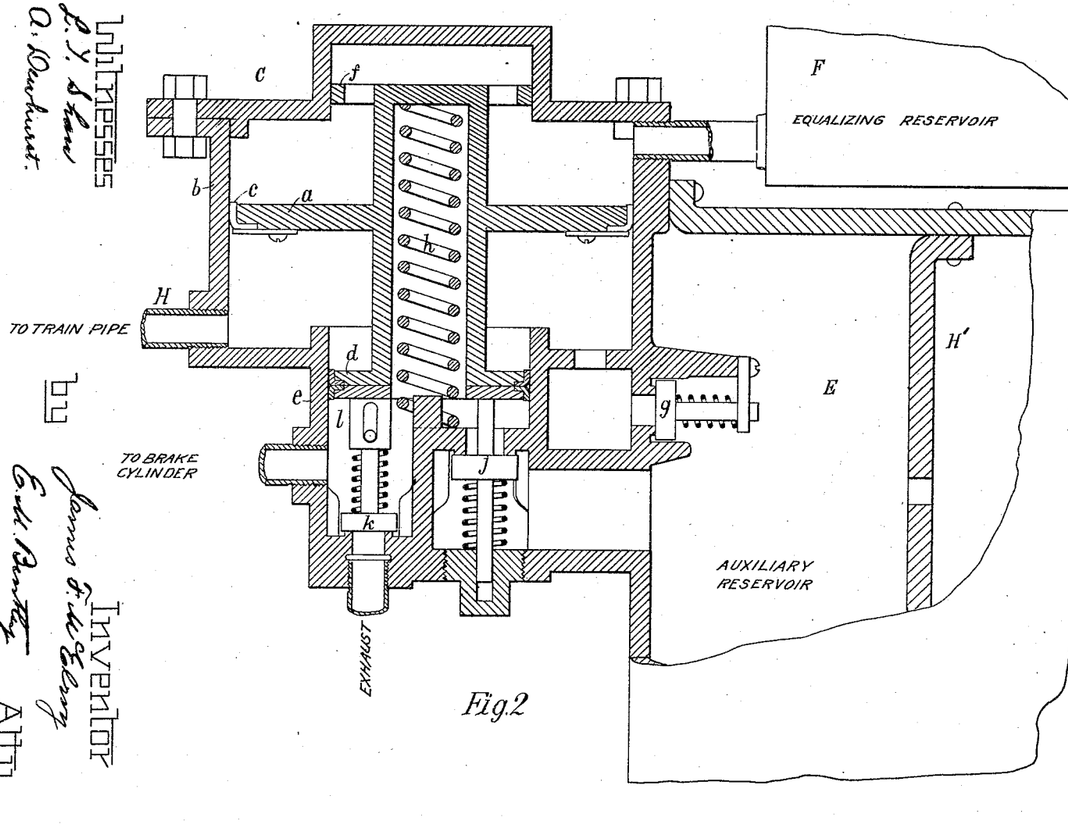
Fig. 2 shows the triple valve in detail.

The operation of the triple valve as thus far described is as follows: During the release period, when the parts are in what may be called the "normal" condition, a determined high pressure is maintained in the train-pipe from the reservoir A, as already described. This train-pipe pressure will also be maintained in the cylinder $b$ below piston $a$ and above piston $d$. This will lift the piston $a$ to a sufficient extent to raise the exhaust-valve $k$ far enough to allow the brake-cylinder to become exhausted and the pressure therein reduced to that of the atmosphere. At the same time the train-pipe pressure will be communicated through valve $g$ to the auxiliary reservoir. The reservoir will thus be maintained at train-pipe pressure. To apply the brakes, the engineer's valve will be turned to a degree corresponding to the brake-pressure desired. This will exhaust the train-pipe to a greater or less extent and allow the piston $a$ of the triple valve to descend, the pressure in the equalizing reservoir then exceeding that in the train-pipe. The descent of piston $a$ will, in the manner above described, close the exhaust-valve $k$ and open the inlet-valve $j$, allowing the air from the auxiliary reservoir to pass through the valve $j$ into the lower part of cylinder $e$ and thence to the brake-cylinder. This flow continues until the pressure in the brake-cylinder and in the cylinder $e$ becomes sufficient to lift the piston $d$ against the pressure above piston $a$ and close the valve $j$. In this way it will be evident that the train-pipe pressure is balanced against the pressure in the brake-cylinder, or vice versa, so that the degree of train-pipe pressure determines the degree of cylinder-pressure, together with the resulting pressure of the brakes upon the wheel; but owing to the different areas of pistons $a$ and $d$ the change of pressure in the cylinder will be much greater in degree than that in the train-pipe. The flow of air into the brake-cylinder from the auxiliary reservoir is thus of no specified amount or duration; but it continues in each individual brake-cylinder for a length of time dependent upon the travel of the piston therein and the amount of air thereby required to fill the cylinder and produce therein the pressure determined upon. This pressure will of course be the same in the brake-cylinder of every car on the train and will be such a pressure as the engineer may determine by the degree to which he allows the train-pipe to exhaust. If now a greater brake-pressure is desired, it is only necessary for the engineer to turn his valve still farther, and thereby reduce the train-pipe pressure to a still greater degree. This will again cause the piston $a$ to descend by reason of the preponderance of the pressure in the equalizing-reservoir, when the valve $j$ will be again opened and a further flow from the auxiliary reservoir into the brake-cylinder will take place and will continue until the pressure in said cylinder and in cylinder $e$ increases sufficiently to raise the piston $d$ and allow the valve $j$ to close again. On the other hand, if the engineer desires to decrease the pressure on the brakes it is only necessary for him to turn his handle back, and thereby restore again to the desired extent the pressure in the train-pipe. This will, as before, be communicated to the cylinder $b$, and in each one of them the piston $a$ will be lifted, and the exhaust-valve $k$ will thereby be opened and sufficient air allowed to escape from the brake-cylinder to reduce the pressure therein to the desired degree. The train-pipe pressure being communicated to the auxiliary reservoir directly through the valve $g$, the reservoir-pressure will therefore be maintained, and for any train-pipe pressure sufficient to overcome the force of the spring tending to seat the valve $g$ there will be a flow of air from the train-pipe directly into the auxiliary reservoir and thence through the valve $j$ directly into the brake-cylinder, and this flow will take place even if the presence of the partition G will not permit the entire space within the brake-cylinder to be rapidly raised to train-pipe pressure. In other words, the partition G serves to differentiate to a slight extent the pressure in the two portions of the reservoir, thereby combining the advantage of a small reservoir, which can be quickly filled and its pressure thereby applied immediately to the brakes, and a larger reservoir requiring a length of time to be filled and emptied, but serving to maintain a more protracted flow of air to the brakes.

It will be observed that in the construction above described the inlet and outlet valves of the brake-cylinder controlled by the pressure within the cylinder constitute, in effect, an automatic governor for the cylinder, which when the cylinder-pressure is below the standard admits more air to raise it to the standard and when it is above the standard allows air to escape to reduce it to the standard. The said standard, however, to which the governor works, is determined by the engineer at any moment and may be by him raised or lowered at will.

Figure 3:
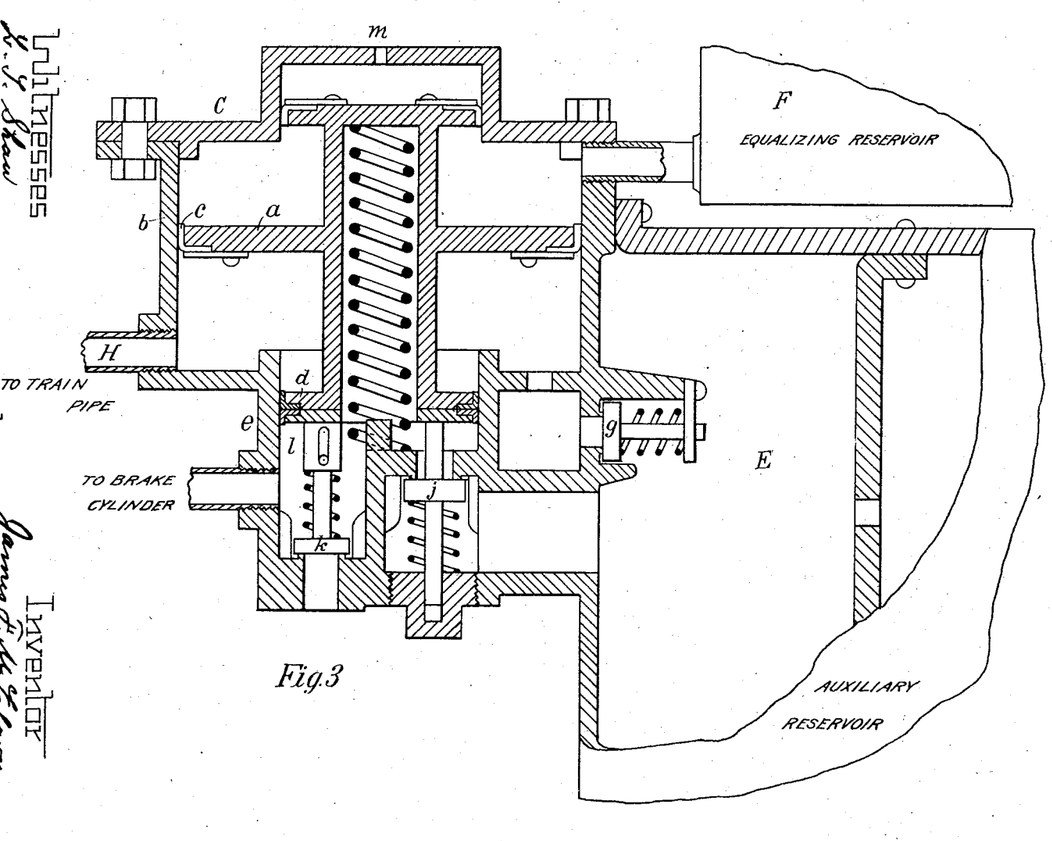
Figs. 3 and 4 show certain possible modifications.

Turning to Fig. 3 of the drawings, I have shown therein a modification of the apparatus of Fig. 2 consisting in forming the guide-disk $f$, Fig. 2, as a piston working in the cylindrical extension of the main cylinder $b$, but communicating with the atmosphere through a small port $m$. By this arrangement the air is prevented from escaping from the cylinder $b$; but the area of the piston $a$, acted upon by the equalizing-reservoir pressure, is reduced in extent, being only that of the annular portion of the piston outside of the central shaft or stem. The area of the other parts of the apparatus should be correspondingly proportioned; but the device is not altered so far as concerns its essential character and mode of operation.

Figure 4:
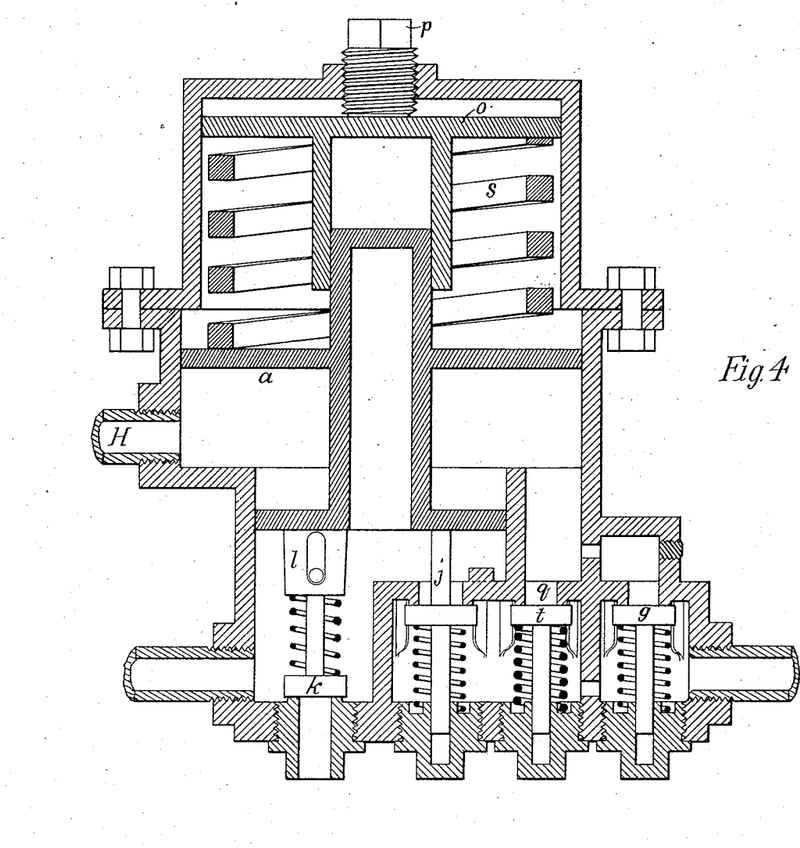
Figure 5:
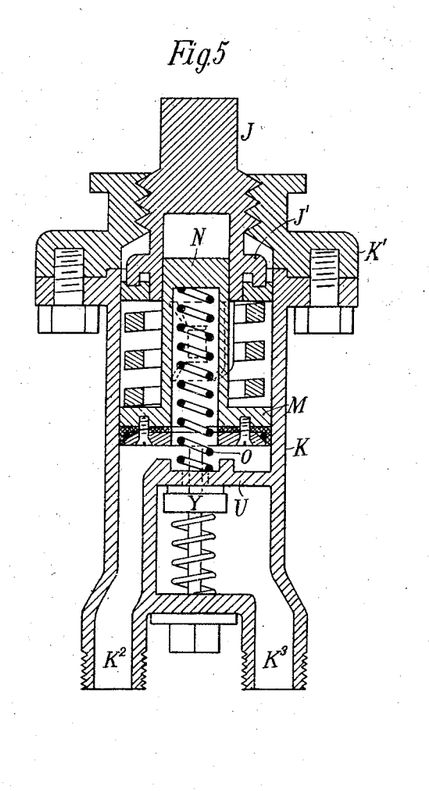
Figs. 5, 6, 7, and 8 show the engineer's valve in detail.

In Fig. 4 I have shown a spring $s$, acting upon the upper side of the piston $a$, as a substitute for the air-pressure supplied by the equalizing-reservoir. The spring $s$ bears at its lower end directly on the piston $a$ and at its upper end bears against a disk $o$, which carries a downwardly-projecting guideway for the stem of piston $a$. An adjusting-screw P bears upon the disk $o$ and serves to adjust the tension of the spring $s$, and thereby determine the back pressure acting upon the piston $a$ in opposition to the pressure imposed by the train-pipe, this being the same function performed by the auxiliary reservoir and acting to determine in the same manner the pressure which will be applied to the brake for each different degree of train-pipe pressure applied by the engineer.

Another feature of modification shown in Fig. 4 consists in the addition of a passage leading directly from the lower part of cylinder $b$ to the brake-cylinder whenever the inlet-valve $j$ is operated. This passage-way is marked $q$ and is normally closed by a check-valve $t$. By this arrangement the brake-cylinder is supplied both from the auxiliary reservoir and also directly from the train-pipe whenever the inlet-valve $j$ is open. The auxiliary reservoir will normally be supplied, as in the other arrangement heretofore described, through the check-valve $q$, and the valve $t$ will only be opened when the pressure on its upper side is greater than the combined action of the air-pressure and the spring-pressure on its under side. This spring-pressure is greater than that under valve $q$, and the opening of $t$ will only occur when valve $j$ is opened so widely—as in an emergency application—that the air-pressure is greatly reduced under the valve. When thus opened, a more direct flow from train-pipe to brake-cylinder will take place. Regarding the modifications appearing in Fig. 4, I would say that I prefer to use the equalizing-reservoir instead of the spring $s$, although the latter is a more simple form, since it (the equalizing-reservoir) permits of the back pressure being automatically adjusted at all times to the standard pressure maintained on the train-pipe while the brakes are released. If there should be any increase in this pressure, there would be sufficient leakage of air past the piston $a$ to produce a corresponding increase in the back pressure from the auxiliary reservoir. With a spring, on the other hand, the adjustment would have to be made permanent by the screw $p$, so that there would be no compensation for variations in train-pipe pressure. This does not, however, affect the complete operativeness of the spring, which may be used with satisfactory results, if so desired. The direct passage from the lower part of cylinder $b$ and the valve $t$ therein will be the preferable form in situations where specially rapid application of the brakes is required.

Figures 6, 7, 8:
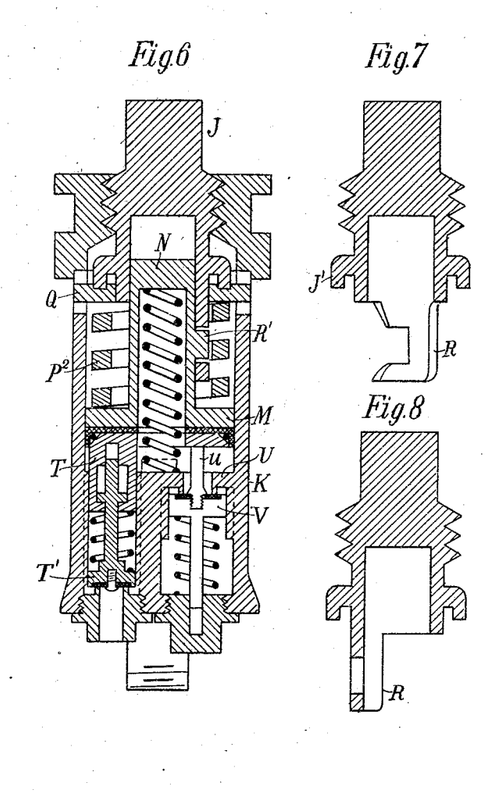

Turning next to the engineer's valve, (shown in detail in Figs. 5, 6, 7, and 8,) K is a cylinder constituting the body of the valve, being closed at its upper end by a cap K' and provided with two passage-ways $K^2$ and $K^3$ at its lower end, the former communicating with the train-pipe H, as appears in Fig. 1, and the latter with the pipe L, leading from reservoir A. Within the cylinder K is a piston M with a suitable packing for retaining air-pressure beneath it and provided with a stem or extension N, which is made hollow and contains a supporting-spring O. A spring $P^2$ bears on the upper side of piston M and on the lower side of an annular disk Q, adapted to slide vertically in guideways formed in the wall of cylinder K, but held against any rotary movement. J is a spindle provided with a squared end for the reception of the handle G and also provided with a coarse screw-thread working in a nut formed in the cap K'. The lower part of the spindle is hollow, so as to fit over the stem N, and is provided with an angular flange J', bearing in a groove upon the upper side of the disk Q. At its lower extremity the spindle is provided with a hook R, adapted to fit loosely over a lug R', projecting from the stem N. The looseness of the engagement of the hook R with the lug permits a slight movement of the latter up or down with respect to the hook for a particular purpose, to be hereinafter described. From the under side of the piston M there is a downward projection T, Fig. 6, which is slotted to receive the stem of the valve T' and lift it from its seat when the piston is raised, but permitting the downward movement of the piston without affecting the valve. Below the piston M the cylinder K is divided internally by a partition U, through which there is a small port controlled by the valve V, which is normally pressed upward by a spring to close the port and which is also provided with a stem $u$, projecting upward through the port to a point just beneath the lower side of the piston M. The pipe L from the reservoir A communicates, as aforesaid, with the passage-way $K^3$, and thereby admits the reservoir-pressure to the lower compartment in the cylinder K, formed by the said partition U. The operation of the valve is as follows: Assuming the parts being in the position shown, the valve V being closed, there will be no communication from the reservoir through the partition U to the space beneath the piston M, which, as aforesaid, communicates by the passage-way $K^2$ with the train-pipe H. This will be the normal condition of the device when the brakes are released. At the same time the hook R will engage with the lug R' and prevent any extended movement of the valve N up or down except as the spindle J is turned by the engineer. If the engineer desires to apply the brakes, by releasing the train-pipe pressure he turns the handle G in a direction to screw the spindle J upward, and thereby relieve the tension upon the spring $P^2$ and at the same time withdraw the hook R from engagement with the lug R'. This permits the piston M to rise under the action of the train-pipe pressure beneath it and open the exhaust-valve T'. This at once allows the air in the train-pipe to escape, and the pressure therein falls until it can no longer sustain the piston M against the downward pressure of the spring $P^2$. The piston then falls and closes the exhaust-port. This gives a certain reduction in train-pipe pressure and in the manner already described produces an application of the brakes with a degree of pressure determined by the amount of reduction effected in the pressure of the train-pipe. If the engineer desires to apply the brakes more forcibly, he continues the movement of the handle a second step, when the action just described is repeated, and the exhaust-valve opens to reduce the train-pipe pressure to a further degree, with a resulting increase in the brake-pressure. In this manner any desired brake-pressure may be secured by a determined movement of the engineer's handle.

If it is desired, however, to decrease the brake-pressure after the brakes have once been applied, it is only necessary for the engineer to turn his handle backward to the desired extent, when the reverse actions to those just described will take place—that is, the spindle J will be screwed downward to increase the tension on the spring $J^2$, which will in turn force the piston M downward until it strikes the stem $u$ of the valve B and opens the valve. This will admit the reservoir-pressure into the train-pipe, which will in turn act in the manner already explained to diminish the brake-pressure. The increase in train-line pressure will continue until it is sufficient to again lift the piston M against the existing tension on spring $P^2$ and permit the valve V to close. The brakes will then remain with the reduced pressure on the wheels until it is desired either to increase or diminish such pressure by a further movement of the handle G in one direction or the other. In this manner the engineer has at all times a complete control over his brakes and may release them, if already applied, or may apply them, if already released, with a greater or less force, and when they are applied he may either increase or diminish the force of the application. All this is determined by the movement of a single handle, each position of the handle corresponding to a definite force of application of the brake.

Apart from the advantages heretofore described it is my purpose to utilize the apparatus above explained for the purpose of compensating for any leaks in the train-pipe or in the engineer's valve. In the systems heretofore used a leak in the train-pipe will obviously tend to reduce the pressure therein, and so set the brakes, and an engineer working with a leaky train-pipe will find that his brakes will gradually become applied, so that it becomes necessary from time to time to admit air from the locomotive-reservoir to maintain the train-pipe pressure and compensate for the leak. On the other hand, if he has a leaky valve he will find that when his brakes are applied the air from the locomotive-reservoir will work through into the train-pipe and release his brakes. In my system, however, if there is a leak in the train-pipe and the pressure therein becomes reduced the piston M of the engineer's valve will automatically drop and open the valve V, allowing the reservoir-pressure to enter the train-pipe and restore therein the pressure lost by the leak. On the other hand, if there is any leak in the engineer's valve tending to increase the train-pipe pressure above the determined point it will lift the piston M, and thereby open the exhaust-valve to relieve the undue train-pipe pressure. In other words, the train-pipe pressure will be automatically maintained in spite of any leaks at whatever point may be determined by the position of handle G.

It must be remembered, however, that it is necessary that the conductor also should have the control of the train and be able at any moment to set the brakes by throwing the conductor's valve W', Fig. 1, to exhaust the train-pipe. If, however, the engineer's valve is free to respond, it will at once act to restore the pressure which the conductor's valve tends to reduce, and thereby prevent the setting of the brakes. To avoid this interference of the engineer's valve with the conductor's valve, I have provided the hook R, already described, which will engage with the lug R' so long as the engineer's valve is not in use and prevent any extended movement of the piston M such as would interfere with the conductor's valve if the hook were not present. At the same time a certain amount of play is permitted to the lug R' within the hook R, which will still permit the valve to operate to a sufficient degree to compensate for leakages in the manner above described, though not to such a degree as will interfere with the action of the conductor's valve.

It will be noted that my system is designed to operate, if desired, by an adjustment of the train-pipe pressure similar to that in the ordinary Westinghouse system, so that cars equipped with my triple valve can operate on the Westinghouse plan in trains already equipped with that system, but with the additional advantage of compensation for wear in the brake-shoes and the different adjustment of the shoes on different cars which I have above described.

I do not claim herein any method or process which may be carried out through the agency of the apparatus described; nor do I claim herein as a distinct article the engineer's valve above shown and described. These matters, though originating with me, have been held to be separate inventions that should be included in separate patents, and it is my intention to make application for such separate patents thereon. It is also to be understood that in the following claims the automatic pressure-governor therein referred to is the device which I have above described as an automatic governor for the cylinder which when the cylinder-pressure is below the standard admits more air to raise it to the standard and when it is above the standard allows air to escape to reduce it to the standard. This device includes the inlet and outlet valves for the brake-cylinder and the automatic mechanism for opening and closing both valves, first, to admit air to the cylinder when the pressure therein falls below the standard and close it again when the standard is reached, and, second, to reduce the pressure in the brake-cylinder when it exceeds the standard by opening the exhaust-valve and then closing it again when the standard is reached. This device, together with the engineer's control of the standard, to which the said governor must conform, is the broad feature of novelty which I claim.

What I claim as new, and desire to secure by Letters Patent, is—

1. In an air-brake system, the combination with a train-pipe, of an engineer's valve having automatic inlet and outlet connections with the train-pipe responding to a pressure determinable by the engineer, a brake-cylinder, an auxiliary reservoir, a pressure-governor for the brake-cylinder responding to a pressure determined by the differential action of the train-pipe pressure and a standard pressure, and a check-valve controlling a connection between the train-pipe and auxiliary reservoir, whereby the auxiliary-reservoir pressure is maintained in a given relation to the train-pipe pressure independently of the amount of air delivered to the brake-cylinder from the auxiliary reservoir.

2. In a brake system the combination with a train-pipe of an engineer's valve having inlet and outlet connections controlled by an adjustable spring acting in opposition to the train-pipe pressure, an auxiliary reservoir in permanent communication with the train-pipe through a check-valve, a brake-cylinder supplied from the auxiliary reservoir and inlet and outlet valves for the brake-cylinder controlled by the differential between the train-pipe pressure and a standard pressure, the said differential being also balanced against the cylinder-pressure.

3. In an air-brake system, the combination with a train-pipe of an engineer's valve connected therewith for admitting air thereto, a brake-cylinder, an auxiliary reservoir having its connection with the cylinder controlled by the pressure in the train-pipe, a source of fixed or standard pressure and a triple valve having means for opposing a fixed pressure to both the train-pipe pressure and that of the brake-cylinder.

4. In an air-brake system, the combination with a train-pipe of an engineer's valve connected therewith for admitting air thereto, a brake-cylinder, an auxiliary reservoir, a valve between the said reservoir and the brake-cylinder controlled by the air-pressure in the train-pipe and a pressure-governor for the brake-cylinder controlled by the differential effect of the air-pressure in the train-pipe and a fixed pressure.

5. In an air-brake system the combination with a train-pipe of an engineer's valve connected therewith for admitting air thereto, an auxiliary reservoir, a source of fixed or standard pressure, a brake-cylinder, a valve between the reservoir and the brake-cylinder controlled by the air-pressure in the train-pipe, and a piston governing the pressure in the brake-cylinder and subjected to the combined pressures of the brake-cylinder, the train-pipe and the fixed pressure.

6. In an air-brake system the combination with a train-pipe, of an auxiliary reservoir, a brake-cylinder, a valve between the said reservoir and the said cylinder operated by the pressure in the train-pipe, a piston subject to the pressures of the brake-cylinder and the train-pipe, and an exhaust-valve for the brake-cylinder controlled as to both its opening and closing by the said piston.

7. In an air-brake system the combination with a train-pipe of an engineer's valve connected therewith for admitting air thereto, a brake-cylinder, an auxiliary reservoir, a valve between said reservoir and cylinder, a piston controlling the said valve and subject to the differential effect of the pressures in the cylinder and train-pipe and an exhaust-valve for the brake-cylinder also controlled as to both its opening and closing by the said piston.

8. In an air-brake system the combination with a train-pipe of an engineer's valve connected therewith and controlling the pressure therein, an auxiliary reservoir, a supplementary source of standard pressure, a brake-cylinder, inlet and outlet valves therefor and pistons of different areas controlling both the opening and closing of said inlet and outlet valves and subject respectively to the train-pipe and the brake-cylinder pressures.

9. In an air-brake system the combination with a train-pipe of an engineer's valve connected therewith and controlling the pressure therein, an auxiliary reservoir, a source of fixed or standard pressure, a brake-cylinder, inlet and outlet valves therefor and pistons of different areas controlling said inlet and outlet valves and subjected one of them to the resultant pressure of the train-pipe and the fixed pressure and the other to the pressure of the brake-cylinder.

10. In an air-brake system the combination with a train-pipe of an engineer's valve connected therewith and controlling the pressure therein, an auxiliary reservoir, a source of fixed or standard pressure, a brake-cylinder, and valves therefor controlled by a larger and a smaller piston, the larger one being subjected to the resultant pressure of the train-pipe and the fixed pressure and the smaller one to the pressure in the brake-cylinder.

11. In an air-brake system, the combination with a train-pipe of a main reservoir, an engineer's valve between said reservoir and train-pipe controlling the inlet and outlet connections of the train-pipe by means of a pressure adjustable by the engineer and acting in opposition to the train-pipe pressure, a limiting device for said engineer's valve, one or more conductor's valves on the train-pipe, an auxiliary reservoir supplied by the train-pipe, a brake-cylinder and inlet and outlet valves therefor controlled by the differential of the train-pipe acting in opposition to a standard pressure, the said differential being balanced against the brake-cylinder pressure.

12. In an air-brake system the combination with a train-pipe, of an engineer's valve for admitting air thereto, an auxiliary reservoir, a brake-cylinder and a triple valve including means for connecting the auxiliary reservoir to the brake-cylinder upon a reduction in train-pipe pressure, a connection between the train-pipe and auxiliary reservoir controlled by a check-valve, and a piston controlling the valves of the brake-cylinder and subject on one side to the train-pipe pressure and balanced by a standard pressure on the other side to the brake-cylinder pressure.

13. In an air-brake system the combination with a train-pipe, of an engineer's valve containing an automatic but adjustable pressure-governor for maintaining any desired pressure in the train-pipe, a brake-cylinder, an inlet-valve therefor controlled by the pressure in the train-pipe balanced by a standard pressure, and means for automatically adjusting the pressure in the brake-cylinder inversely as the pressure in the train-pipe.

14. In an air-brake system the combination with a train-pipe of an engineer's valve capable of increasing or decreasing the train-pipe pressure at will, an auxiliary reservoir, a permanent check-valve connection between train-pipe and reservoir, a brake-cylinder, inlet and exhaust valves for the brake-cylinder and a pressure-governor for the said cylinder subject to the cylinder and train-pipe pressures and controlling the said valves.

15. A triple valve for an air-brake system provided with connections for a train-pipe, a brake-cylinder and an auxiliary reservoir respectively, and containing an automatic pressure-governor controlled by the brake-cylinder and train-pipe pressures together with a standard pressure and operating both the inlet and the exhaust valves of the said cylinder.

16. A triple valve for an air-brake system provided with connections for a train-pipe, a brake-cylinder and an auxiliary reservoir respectively and containing an automatic pressure-regulator connected on one side to the space communicating with the brake-cylinder and on the other side to the space communicating with the train-pipe and controlled by the train-pipe and brake-cylinder pressures and operating both the inlet and exhaust valves of the said cylinder.

17. A triple valve for an air-brake system provided with connections for a train-pipe, a brake-cylinder and an auxiliary reservoir respectively and containing an automatic pressure-regulator operating both the inlet and exhaust valves of the said cylinder, the said regulator being provided with a tension device and communicating with the space leading to the brake-cylinder on the one side and the space leading to the train-pipe on the other side, whereby it may be subjected to the opposing action of the pressures in the train-pipe and the brake-cylinder respectively.

18. A triple valve for an air-brake system provided with connecting devices for a train-pipe, a brake-cylinder and an auxiliary reservoir respectively and provided with an automatic pressure-governor operating both the inlet and the exhaust valves of the brake-cylinder and having a tension device controlled by the opposition of train-pipe and brake-cylinder pressures.

19. A triple valve for an air-brake system comprising in combination a valve controlling the admission of air from the auxiliary reservoir to the brake-cylinder, an exhaust-valve for the brake-cylinder, a piston operating both of the said valves and subjected to the pressure in the brake-cylinder, a substantially constant tension device opposing the brake-cylinder pressure and means for adjusting said tension device by the pressure in the train-pipe.

20. A triple valve for an air-brake system comprising in combination a cylinder $b$, a piston $a$, a duct for connecting the brake-cylinder with the space on one side of the said piston, an exhaust-valve $e$ for the brake-cylinder, an inlet-valve $j$ therefor, a check-valve $g$ for admitting train-pipe pressure to the auxiliary reservoir, a tension device connected with the piston $a$ and a piston $d$ acting upon the said tension device for adjusting it and acted upon by the air-pressure in the train-pipe.

21. In an air-brake system the combination with a brake-cylinder and an auxiliary reservoir of an automatic pressure-regulator for the brake-cylinder operated by the pressure therein, a tension device for the said regulator and an adjuster for the said tension device controlled by the pressure in the train-pipe.

22. In an air-brake system the combination with a brake-cylinder of an automatic pressure-regulator therefor, an auxiliary reservoir, a train-pipe, and a tension device for the regulator operated by the train-pipe pressure, the effective tension thereof being decreased by an increase of train-pipe pressure and increased by a decrease of train-pipe pressure.

23. In an air-brake system, the combination with a train-pipe of an engineer's valve having automatic inlet and outlet connections with the train-pipe responding to a pressure determinable by the engineer, a brake-cylinder, an auxiliary reservoir in permanent connection with the train-pipe through a check-valve, a source of standard pressure balancing the train-pipe pressure, a piston subjected to the said balanced pressures and also to the brake-cylinder pressure, a duct between the brake-cylinder and auxiliary reservoir, a valve therein opened by one direction of movement of said piston and an exhaust-valve for the brake-cylinder opened by the opposite direction of movement of said piston.

24. In an air-brake system the combination with a brake-cylinder, an auxiliary reservoir, a train-pipe, a supply-valve between the train-pipe and the reservoir, an automatic regulator having pistons of different areas controlling both the inlet and the outlet valves of the brake-cylinder and a tension device for the said regulator adjusted by the pressure in the train-pipe.

25. In an air-brake system the combination with an auxiliary reservoir, of a train-pipe, a check-valve between said reservoir and train-pipe, a brake-cylinder, an automatic pressure-governor for said cylinder comprising inlet and outlet valves, a source of standard pressure and operating devices for the said inlet and outlet valves controlled by said standard pressure, and means for adjusting said standard pressure by the train-pipe pressure.

26. A triple valve for air-brakes containing in combination a valve located in a passage between the auxiliary reservoir and the brake-cylinder, an exhaust-valve for the brake-cylinder, an operating device for the said valves subject to the joint force of the train-pipe pressure, the brake-cylinder pressure and a standard pressure, and a check-valve between the train-pipe and the auxiliary reservoir permitting the flow of air in one direction only, to wit from the train-pipe into the reservoir.

27. An automatic pressure-governor for an air-brake cylinder, comprising an inlet-valve between the said cylinder and an auxiliary reservoir, an exhaust-valve for the cylinder, a source of standard pressure balanced against the cylinder-pressure, an actuating device for the inlet-valve responding to a preponderance of standard pressure over cylinder-pressure but retaining the valve closed when the said pressures are in equilibrium, and an operating device for the exhaust-valve responding to a preponderance of cylinder-pressure over standard pressure but retaining the valve closed when the said pressures are in equilibrium.

28. An automatic pressure-governor for an air-brake cylinder comprising an inlet-valve between the said cylinder and an auxiliary reservoir, an exhaust-valve for the cylinder, a source of standard pressure balanced against the cylinder-pressure and consisting of an equalizing-reservoir containing air under substantially constant pressure, an actuating device for the inlet-valve subject to the differential pressure of the standard and cylinder pressures and set to open it when the standard pressure preponderates and close it when they are in equilibrium and an actuating device for the exhaust-valve also subject to said differential pressure and set to open it when the cylinder-pressure preponderates and close it when they are in equilibrium.

29. An automatic pressure-governor for an air-brake cylinder comprising inlet and exhaust valves, a source of standard pressure balanced against the cylinder through pistons of different areas, the larger one presented to the standard pressure and the smaller one to the cylinder-pressure, and actuating devices for the said valves responding to the differential effect of said pressures.

30. A triple valve for air-brakes containing inlet and exhaust valves for the brake-cylinder and actuating-pistons therefor of different areas, the larger one subject to train-pipe pressure and the smaller one to the opposing brake-cylinder pressure.

31. The combination with an auxiliary reservoir of a train-pipe, a brake-cylinder, a valve between reservoir and cylinder, an exhaust-valve for the cylinder, actuating-pistons of different areas for the said valves, the larger piston subject to train-pipe pressure, the smaller one to the opposing brake-cylinder pressure and a source of standard pressure also acting on the said valves.

32. The combination with an auxiliary reservoir of a train-pipe, a brake-cylinder, inlet and exhaust valves for the cylinder, an automatic operating device for said valves, a source of standard pressure balanced against the brake-cylinder pressure and governing the said operating device, a duct between the train-pipe and the said reservoir entering the reservoir at a point adjacent to the outlet therefrom into the brake-cylinder and a check-valve in said duct permitting the flow of air from the train-pipe into the reservoir, but preventing a return flow.

33. A triple valve containing a duct from the train-pipe to the auxiliary reservoir, a check-valve in said duct preventing a backflow from the reservoir to the train-pipe, a second duct leading from the said reservoir to the brake-cylinder, an inlet-valve in said second duct, a piston controlling said inlet-valve and subject to the opposing force of the cylinder-pressure and a standard pressure, and means for adjusting said standard pressure inversely as the pressure in the said train pipe.

In witness whereof I have hereunto set my hand, before two subscribing witnesses, this 13th day of February, 1902.

JAMES F. McELROY.

Witnesses:
SAMUEL J. SMITH,
ERNEST D. JANSEN.